Jan. 2, 1951  A. R. LONG ET AL  2,536,950
PAN FOR CHAIN CONVEYERS

Filed May 5, 1947  2 Sheets-Sheet 1

INVENTORS.
Armistead R. Long
John B. Long
BY
ATTORNEYS.

Jan. 2, 1951  A. R. LONG ET AL  2,536,950
PAN FOR CHAIN CONVEYERS
Filed May 5, 1947  2 Sheets-Sheet 2

INVENTORS
Armistead R. Long
John B. Long
BY
ATTORNEYS.

Patented Jan. 2, 1951

2,536,950

UNITED STATES PATENT OFFICE 2,536,950

PAN FOR CHAIN CONVEYERS

Armistead R. Long and John B. Long,
Fayetteville, W. Va.

Application May 5, 1947, Serial No. 745,896

9 Claims. (Cl. 198—204)

This invention relates to conveyors and more particularly to improvements in pans for conveyor chains of the character using flights to advance the material in the pans.

It is common practice to provide such pans with trough sections connected together in end to end relation in which the upper run of the endless chain and its flights move and to provide below the trough sections spaced rails on which the end portions of the flights of the lower run of the chain travel during operation of the conveyor. Due to rough handling of the pans during transportation, assembly and dismembering of the conveyor, the end portions of the rails of the pans are apt to be bent to a degree where they do not accurately align when pan sections are coupled together, or if not bent, due to declivities in the surface supporting the pans or faulty "blocking-up" of the pans at joints over such declivities, the flight supporting surfaces of the rails are not in the same plane, which results in the flights catching against the high side of the rail. This causes considerable wear on the flights, subjects the chain to considerable strain and occasionally results in breakage of the chain or bending or breakage of the flights.

It is one of the objects of the present invention to provide means for easing, so to speak, the flights over the zone of the track ends, thus reducing wear on the flights and avoiding the strain, bending and breakage above referred to.

When the pans are assembled upon an uneven surface, care is usually exercised to align the pans so that the bottoms of the trough sections are in substantially the same plane. However, due to carelessness or other reasons, such as low ceilings in mine workings, it will be found that the pan sections are not so arranged, but rather have two or more pan sections depressed as joints. As a result, the lower run of the chain, instead of being supported by the flights having their end portions riding on the rails, will, when drawn taut, cause the flights or chain to rub against the undersides of the trough section bottoms. Under such conditions, the flights are apt to strike the low adjacent end of the trough section bottom or strike the transverse flange which is frequently secured to and projects endwise from the underside of one end of the trough section bottom to act as a seat for the adjacent end of the companion pan trough section. This striking of the flights against the low ends of the trough sections or the seat flanges thereof also subjects te conveyor to unusual wear and the chain to strain, and is likely to result in breakage of the chain or flights, or the bending of the latter.

It is another object of the invention to ease the conveyor chain along and beneath such obstructions and thereby contribute toward long life of the conveyor.

Other objects and advantages of the invention will appear in the following detailed description of the preferred embodiment of our invention, taken in connection with the accompanying drawings, forming a part of this specification, and in which drawings.

Figure 1:
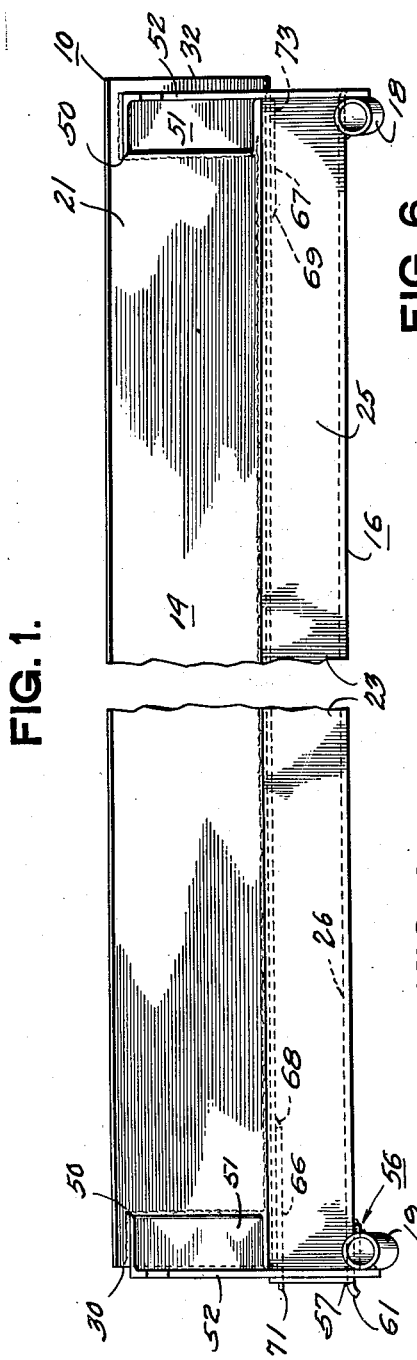
Fig. 1 is a side elevation of a conveyor pan constructed according to our invention, a central portion of same being broken away and removed to condense the view.

According to the construction and arrangement of parts of conveyors, using pans and conveyor chains, in common use, there may be provided as many as four or more flights to each pan, and the chain may travel at the rate of approximately 100 feet per minute. Since the flights carry the weight of the lower run of the chain by the end portions of the flights riding on the rails beneath the trough sections of the pans, the flights in passing from one pan to another hit the unprotected joints between the rails. The great number of pounding blows delivered to any imperfect joint between pans at the confronting ends of the rails, when the conveyor is in operation, has a great tendency to beat down the ends of the rails and increase any gap between such confronting ends as well as throw a strain on the bolts connecting the pans. As a result of these blows and vibration incident thereto, the bolts work loose, increasing the gap between the rails. This causes considerable wear of parts and at times breakage of the chain or otherwise rendering the conveyor inoperative.

While the present invention is applicable to the common type of conveyor, the invention is here shown and described as applied to conveyors disclosed in our copending application for patent filed January 5, 1945, Serial No. 571,428, now Patent 2,420,085, dated May 6, 1947.

Generally speaking the conveyor comprises a plurality of pans 10 arranged in end to end relation, coupling means 11 for joining them in such relationship, and an endless conveyor chain 12 for moving the material in portions of the pans.

Each pan in the example shown comprises an elongated trough 14, in which the upper run 15 of the conveyor chain 12 moves, track means 16 extending longitudinally of and beneath the trough 14 for normally supporting the lower run 17 of the chain conveyor, and skids 18 and 19 beneath and carried by the end portions of the track means 16 transversally thereof.

Figure 6:
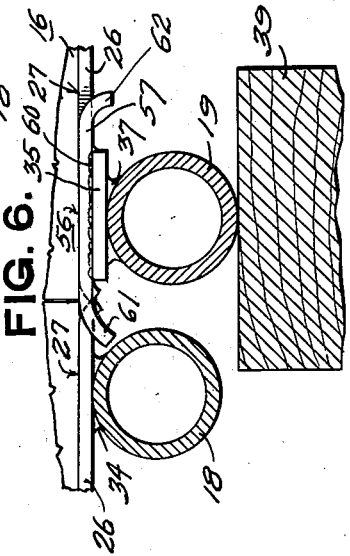
Fig. 6 is an enlarged sectional view thru supporting skids of aligned lower end portions of pan sections, showing one of the skids resting upon a block, the section being on substantially the line 6—6 of Fig. 3, of one of the pan sections and 6—6 of Fig. 4, of the other pan section.
Figure 3:
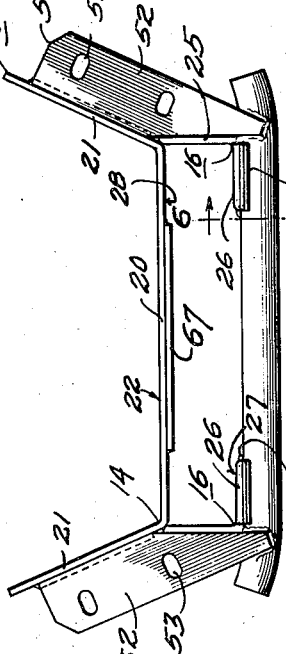
Fig. 3 is a view in elevation, looking toward the right end of Fig. 1.
Figure 2:
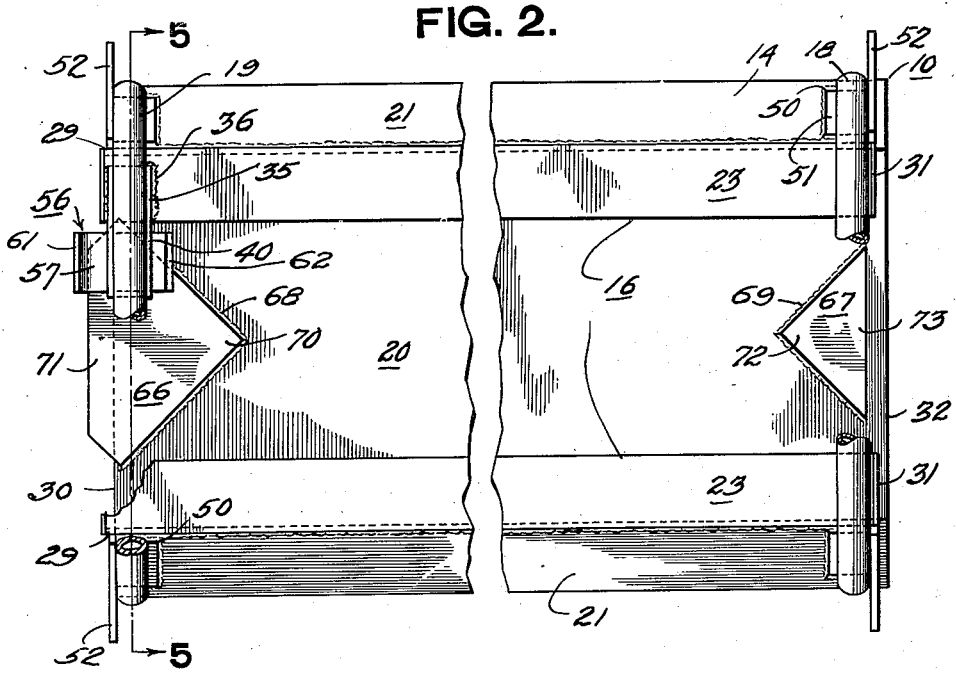
Fig. 2 is a similar view in bottom plan, portions at ends being broken away and removed to disclose preferred details.

The track means 16 preferably comprises spaced stringers 23 each of angle cross section with upright flanges 25 welded or otherwise secured to the trough adjacent the juncture between the side walls 21 and bottom 23, and horizontal flanges 26 extending inwardly from the flanges 25 toward each other. The flanges 26 serve as rails for supporting the lower run of the conveyor chain, the upper surface of each flange 26 constituting a tread 27 as later explained. These flanges 26 hereafter termed "rails" are of a length substantially equal to the length of the trough and are arranged in parallel relation so that their treads 27 are spaced below and face the under side 28 of the trough bottom 20. It is also preferred to locate these rails 26 with respect to the trough, so that one end 31 of each rail is set inwardly of the vertical plane of the one trough end 30, and to have the other end 29 of each rail project outwardly beyond the vertical plane of the other trough end 30 as shown in Fig. 2. It is also preferred to bend the ends 29 and 31 downwardly as shown in Figs. 2 and 6 to resist distortion if the pans are roughly handled during transportation, assembling and dismembering of the pans.

The skids 18 and 19 are preferably of the same height and may be made from tubular stock of the same diameter. Carrying out a feature of the invention disclosed in the aforementioned Patent 2,420,085, it is preferred to secure the skid 18 directly to the underside of rails 26 as by welds 34 and secure the skid 19 to the rails 26 thru the intermediacy of spacer plates 35 interposed between the rails and the skid, and secured in place to these elements as by welds 36 and 37 respectively. In this way the skid 19 is disposed lower than the skid 18 with respect to the bottom of the track means 16 thus permitting of support of the pans adjacent joints on a block 39 with only one of the adjacent skids engaging same. This facilitates "blocking up" of the conveyor over depressions in the surface over which the conveyor extends.

Figure 4:
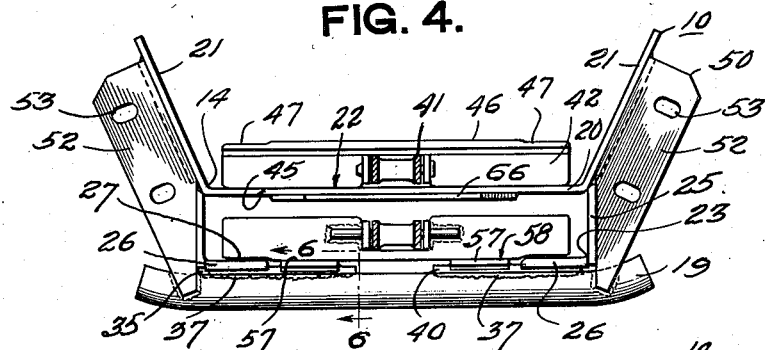
Fig. 4 is a view in elevation, looking toward the left end of Fig. 1, and showing, by way of example, a conveyor chain with its flight in place.
Figure 5:
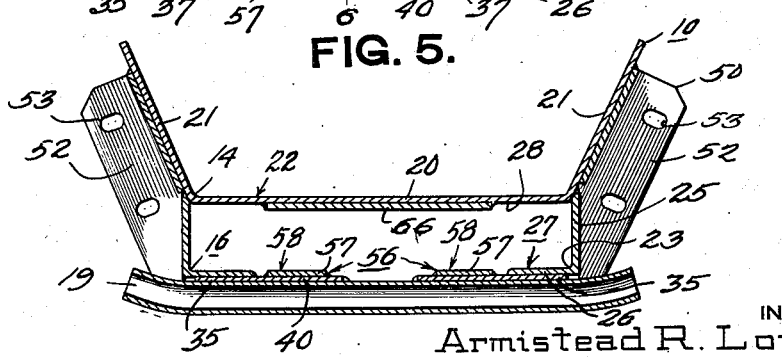
Fig. 5 is a sectional view on the line 5—5 of Fig. 2.

For a purpose to be subsequently set forth, these spacer plates 35 are longer than the corresponding spacers in the aforementioned Patent 2,420,085, so as to provide portions 40 extending inwardly beyond the rails 26, as shown in Figs. 2, 4 and 5.

Figure 7:
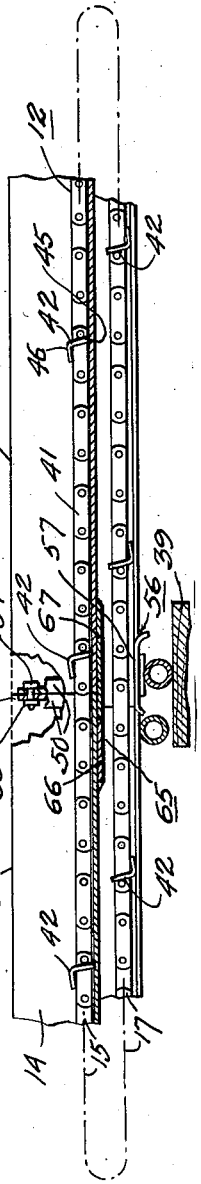
Fig. 7 is a longitudinal vertical sectional view similar to Fig. 6, on a smaller scale and showing the upper and lower runs of a chain conveyor carried by the trough sections and rails of the pan sections.

The conveyor chain comprises a chain 41 and flights 42 extending to each side of the axis of the chain. In the example shown this conveyor chain embodies chain sections and flights similar to those disclosed in our copending application for patent on combination chain sections and flights, filed February 2, 1948, Serial No. 5,698. However the pans may be used with the conventional conveyor chains which have some of the characteristics of that herein disclosed, such as flights of a height greater than the height of the chain sections, and arranged so that the chain section at each flight is between the opposite longitudinal edges 45 and 46 of the flight as shown in Figs. 4 and 7. Thus the edges 45 of the flights rub on the upper side 22 of the trough bottom 20 when traveling in the trough 14, and the edges 46 normally rub on the treads 27, particularly at their end portions, when traveling beneath the trough. In Fig. 4 the edges are shown partly worn away at 47, a condition resulting from long use of the conveyor chain. This normally disposes the major or intermediate portion of the edge 46 between the rails 26 at the lower run 17 of the conveyor chain as shown in Fig. 4.

Any suitable coupling means 11 may be provided for joining the pans together. In the example shown such comprises upright angle members 50 secured to each end that at each side of the pan, the one flange 51 of each member being secured to its respective side wall 21 and its other outstanding flange 52 provided with transverse holes 53 for the reception of the shanks of bolts 54 or other securing devices as is common practice. When pans are arranged in end to end relation and the bolts are in place, a nut 55 may be screwed upon the shank of each bolt for drawing the pans together. It is these bolts and nuts which are frequently loosened in the ordinary conveyor construction due to the pounding blows and vibration incident thereto, when the flights of the lower run 17 of the conveyor chain are permitted to impinge against the ends of the rails 26 at imperfect joints.

In order to guard against this and to reduce wear as well as reduce bending or breakage of the flights and chain to a minimum, we provide means 56 at one end of each pan, constructed and arranged between the rails 26, to ease the flights over the joints between the rail of adjacent pans. Such means preferably comprises two relatively short rails 57 having treads 58 in substantially the same plane as treads 27, preferably mounted upon and secured to the extending portions 40 of spacer plates 35, as by welds 60. These rails 57 extend beyond the vertical plane of the ends of rails 26, as shown in Figs. 1, 2, 6 and 7 and preferably have their end portions downturned as at 61 and 62 so as to ease worn flights upwardly upon the treads 58 of rails 57 as is shown in Fig. 4. Since the conveyor chain is usually moved in a predetermined direction for conveying material such as coal from a mine working, but is sometimes reversed to deliver supplies to the miners, these rails 57, and particularly the downturned portions 61 and 62, function to ease the flights over the joint regardless of the direction of travel of the lower run 17 of the conveyor chain.

For many years it has been the practice to secure an elongated plate or strip of metal beneath and transversally of the bottom of the trough section of each pan at one end thereof and projecting outwardly of such end. This element is generally termed a "rest plate" in that the end of an adjacent pan trough section devoid of such a rest plate at such end rests upon it. Having substantially parallel longitudinal margins the rest plate presents an obstruction in the path of flights of the conveyor chain when the pans join with a low joint, and the conveyor is in operation. In other words, at a low joint, the conveyor chain in operation being drawn somewhat taut, lifts the flights from the rails usually supporting them, and causes the flights to rub against the under faces of the trough sections at the low joint. There they are confronted by and engage one of the marginal edges of the rest plate, extending normal to the path of travel of the flights. This also is destructive to the flights and chain, and the blows and incident vibration is apt to cause the bolts used in connecting the pans to work loose.

In order to guard against the undesirable characteristics of conveyors now in common use we provide means 65 constructed and arranged to gradually depress the conveyor chain at a low joint from engagement with the lower face of the trough bottom when the conveyor chain abnormally rides in engagement with such face. This means preferably comprises two substantially triangular plates 66 and 67 secured to the underside of the end portions of the trough bottom, as by welds 68 and 69, respectively. The plate 66 may be larger than the plate 67 and the former is preferably located at the end portion of the pan where the projecting ends 29 of the rails are also located. The plate 66 has a vertex portion 70 pointing toward the center of the trough bottom, and a base line portion 71 extending transversely of the trough bottom and extending beyond the end of the trough bottom to act as a rest plate for the trough of an adjacent pan as shown in Fig. 7. The plate 67 is located at the other end of the trough, has a vertex portion 72 also pointing toward the center of the trough bottom, and a base line portion 73 set inwardly of the adjacent end of the trough bottom, a distance substantially equal to the projecting portion of plate 66. Thus when two pans are coupled together the base line portions 71 and 73 of adjacent plates 66 and 67, respectively, are in close relationship and the two plates form a substantially diamond shaped plate like projection at the joint as is obvious from an inspection of Figs. 2 and 7.

If the conveyor chain, due to a low joint is drawn taut so that its flights rub against the lower face of the troughs during operation of the conveyor, the vertex portion of the plate pointing in a direction counter to the direction of travel of the lower run of the conveyor chain will gradually depress the conveyor chain from the plane of the lower face of the trough bottom in advance of the joint between pans and thus avoid the destructive or damaging blows which result where the flights are confronted by a rest plate edge normal to the path of travel of the lower run of the conveyor chain. These vertex portions of the plates 66 and 67 will function as described regardless of the direction of movement of the said lower run.

The welds 68 and 69 taper off in the usual way as indicated in Figs. 1 and 2, so that the flights are guided thereby into engagement with the initial plate encountered in the path of movement of the conveyor chain, so that the flights do not encounter an abrupt obstacle when approaching a joint and the type of flight shown in our aforesaid application Serial No. 5,698 having a transversally beveled marginal edge 45 is particularly well adapted to ride into engagement with the plate without destructive or injurious impact.

We claim:

1. A pan for endless conveyor chains of the type having flights extending to each side of the longitudinal axis of the chain, comprising an elongate trough for the upper run of the conveyor chain, spaced apart parallel rails extending longitudinally of and beneath said trough and of a length substantially equal to the length of said trough forming a track upon which the end portions of the flights ride for supporting the lower run of the chain, and means at one end of the pan, constructed and arranged between said rails, for supporting the flights in their movement off or onto the ends of the rails adjacent said means, in substantially the same plane as the plane of the treads of said rails.

2. A pan for endless conveyor chains of the type having flights extending to each side of the longitudinal axis of the chain, comprising an elongate trough for the upper run of the conveyor chain, spaced apart parallel rails extending longitudinally of and beneath said trough and of a length substantially equal to the length of said trough forming a track upon which the end portions of the flights ride for supporting the lower run of the chain, and relatively short rails carried by the pan at one end portion thereof, between said first mentioned rails, extending beyond the plane of the ends thereof and disposed with the planes of their treads in substantially the same plane as the plane of the treads of said first mentioned rails for supporting the flights in their movement off or onto ends of the latter.

3. A pan for endless conveyor chains of the type having flights extending to each side of the longitudinal axis of the chain, comprising an elongate trough for the upper run of the conveyor chain, spaced apart parallel rails extending longitudinally of and beneath said trough and of a length substantially equal to the length of said trough forming a track upon which the end portions of the flights ride for supporting the lower run of the chain, a transverse skid carried by one end portion of the pan beneath the said rails, and relatively short rails carried by and above said skid, between said first mentioned rails, extending beyond the plane of the ends thereof and disposed with their treads in substantially the same plane as the plane of the treads of said first mentioned rails for supporting the flights in their movement off or onto the ends of the latter.

4. A pan for endless conveyor chains of the type having flights extending to each side of the longitudinal axis of the chain, comprising an elongate trough for the upper run of the conveyor chain, spaced apart parallel rails extending longitudinally of and beneath said trough and of a length substantially equal to the length of said trough forming a track upon which the end portions of the flights ride for supporting the lower run of the chain, transverse skids of uniform height, one for each end portion of the pan, the skid at one end being secured directly to the underside of said rails, and the skid at the other end being secured to the under side of the rails thru the intermediacy of spacer plates extending inwardly beyond said rails, and relatively short rails mounted upon the extending portions of said spacer plates, extending beyond the plane of the ends of said first mentioned rails and disposed with their treads in substantially the same plane as the plane of the treads of said first mentioned rails for supporting the flights in their movement off or onto the ends of the latter.

5. In a conveyor, the combination of means for moving material comprising an endless chain and flights carried by and extending laterally to each side of the axis of the chain, arranged to provide an upper run and a lower run; conveyor pans for said means, each comprising an elongated trough in which said upper run moves, and spaced apart parallel rails extending longitudinally of and beneath said trough forming a track upon which the end portions of the flights ride for supporting said lower run; means joining said pans in end to end relation with the rails substantially in end to end alignment; and means in the zone of the joint between adjacent pans, constructed and arranged between said rails for supporting the flights, in their movement from one rail to another, on substantially the same plane as the plane of the tread of said rails.

6. A pan for endless conveyor chains of the type having flights extending to each side of the longitudinal axis of the chain, comprising a trough for the upper run of the conveyor chain, including a bottom, a track spaced below said bottom for normally supporting the lower run of the conveyor chain; and means secured to the underside of each end portion of said trough bottom, constructed and arranged to gradually depress the conveyor chain from the plane of the lower face of the trough bottom at the ends of the pan, when the conveyor chain abnormally rides in engagement with said bottom intermediate said ends.

7. A pan for endless conveyor chains of the type having flights extending to each side of the longitudinal axis of the chain, comprising a trough for the upper run of the conveyor chain, including a bottom; a track spaced below said bottom for normally supporting the lower run of the conveyor chain; and a substantially triangular plate secured to the underside of each end portion of said trough bottom, the plates each having a vertex portion pointing toward the center of the trough bottom and a base line portion extending transversally of the trough bottom, one of said plates disposed with its base portion extending beyond the end of the trough bottom and the other of said plates disposed with its base portion set inwardly of the end of the trough bottom whereby the conveyor chain abnormally riding in engagement with the underside of the trough bottom will be depressed from the plane of said underside as it bears upwardly against said plates.

8. In a conveyor, the combination of means for moving material comprising a conveyor chain including an endless chain and flights carried by and extending laterally to each side of the axis of the chain, arranged to provide an upper run and a lower run; conveyor pans for said means, each comprising a trough including a bottom for supporting the upper run of the conveyor chain and means spaced below said bottom for normally supporting the lower run of the conveyor chain; means joining said pans in end to end relation; and means in the zone of the joint between said trough bottoms, located beneath said trough bottoms, constructed and arranged to gradually depress the conveyor chain from the plane of the lower face of the trough bottoms when the conveyor chain abnormally rides in engagement with the pan bottoms intermediate their ends.

9. In a conveyor, the combination of means for moving material comprising a conveyor chain including an endless chain and flights carried by and extending to each side of the axis of the chain, arranged to provide an upper run and a lower run; conveyor pans for said means, each comprising an elongated trough including a bottom for supporting the upper run of the conveyor chain, and spaced apart parallel rails extending longitudinally of and beneath said trough forming a track upon which the end portions of the flights ride for supporting said lower run; means joining said pans in end to end relation with the trough bottoms in approximate alignment and the rails in approximate alignment; means in the zone of the joint between adjacent pans, constructed and arranged between said rails for normally supporting the flights, in their movement from one rail to another, on substantially the same plane as the plane of the treads of said rails; and means in the zone of the joint between the trough bottoms, located beneath said trough bottoms, constructed and arranged to gradually depress the conveyor chain from the lower face of the trough bottoms when the conveyor chain abnormally rides in engagement with the pan bottoms intermediate their ends.

ARMISTEAD R. LONG.
JOHN B. LONG.

REFERENCES CITED

The following references are of record in the file of this patent:

UNITED STATES PATENTS

| Number | Name | Date |
|--------|------|------|
| 293,546 | Weeks | Feb. 12, 1884 |
| 2,420,085 | Long | May 6, 1947 |